United States Patent Office 3,732,206
Patented May 8, 1973

3,732,206
PREPARATION OF ETHER-ESTER STARCH
DERIVATIVE
Leslie P. Kovats, Granite City, Ill., assignor to Anheuser-Busch, Incorporated, St. Louis, Mo.
No Drawing. Filed Mar. 1, 1971, Ser. No. 119,871
Int. Cl. C08b 19/04
U.S. Cl. 260—233.5                                    7 Claims

ABSTRACT OF THE DISCLOSURE

The disclosure describes a mixed dextrin ether-ester derivative and specifically hydroxyethyl or hydroxypropyl starch dextrin ether-esters of dibasic organic acid anhydrides, preferably succinic or maleic anhydrides. The product is made by an essentially dry process involving the heating of intimately contacted hydroxyethyl or hydroxypropyl starch or starch dextrin with dibasic organic acid anhydride at a temperature of 100–160° C. in the presence of 0.5% to 10% moisture for selected times to produce a product of about 0.0016 to about 0.16 degree of substitution.

These products are in unswollen granule form and are useful as thickeners and as adhesives, which can include borax, alkali metal hydroxide and water.

BACKGROUND OF THE INVENTION

This invention relates to the preparation of mixed dextrin ether-ester derivatives. More particularly, the present invention relates to the preparation of dextrin or starch ether-ester derivatives by heating a hydroxyethyl or hydroxypropyl dextrin or starch derivative with dibasic organic acid anhydrides in a substantially dry state.

In the present process, the reactants are dry blended in finely divided form and heated to react the same. The dry process reaction eliminates drying, filtration, etc., and readily adapts to either a batch or continuous process.

Thus, it is a principal object of the present invention to provide a starch derivative or dextrin ether-ester of organic acid. Another principal object is to provide a process of making a starch or dextrin ether-ester of organic acids which does not use water in the reaction. Still another object is to provide a dry reaction between starch ether derivatives or dextrin ethers and succinic and maleic anhydrides which produces a low degree of substitution in the resulting starch or dextrin ether-ester. Still another object is to produce an unswollen granule reaction product of starch ether or dextrin ether and a dibasic anhydride.

It is an object of this invention to provide a process whereby improved dextrins may be prepared easily and economically.

Another principal object of this invention is to provide dextrin ether-ester based adhesive compositions, characterized by exceptional improvement in such properties as adhesion bond-strength, quick tack and light product color.

Another object of this invention is to provide a basic adhesive composition with improved properties to which various modifying agents can be added, to provide additional advantages and increase the versatility of the basic formula.

Still another object is to provide a process for the production of dextrin ether-ester derivatives which are light in color and have a moderately high viscosity in water.

These and other objects and advantages will be apparent hereinafter.

The present invention comprises a dry method of making starch and dextrin derivative ether-esters of dibasic organic acids and the products produced thereby.

DETAILED DESCRIPTION

Dextrins are commonly prepared by roasting starch or a starch derivative in presence of hydrochloric acid as a catalyst. The hydroxyethyl dextrin used in the examples of this application was prepared by roasting hydroxyethyl starch in the presence of a small amount of hydrochloric acid as a catalyst.

The starting material in this process is a starch derivative or a dextrin derivative. The starch derivative is hydroxyethyl starch which is prepared by reacting starch with ethylene oxide in the presence of an alkaline catalyst. This product has a formula of HO—CH$_2$—CH$_2$—O—R (R—O represents starch) and has 5 to 11 hydroxyethyl groups per 100 anhydroglucose units. Another suitable starch derivative is hydroxypropyl starch. Hydroxypropyl starch may be prepared by reacting starch with propylene oxide in the presence of an alkaline catalyst. This material has a formula of

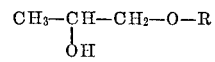

(R—O represents starch.)

If the starting material is a hydroxyethyl dextrin, the hydroxyethyl starch previously described is treated in a dextrin roaster for 2 to 3 hours at a temperature of 120° C. to 135° C. with 10 to 20 ml. 0.7 N HCl/pound starch derivative in the presence of 8 to 12% moisture. This results in a dextrin of 25 to 95 degrees fluidity and 5 to 11 hydroxyethyl groups/100 anhydroglucose units.

If the starting material is a hydroxyethyl dextrin or a hydroxypropyl dextrin, the hydroxyethyl starch or hydroxypropyl starch previously described is treated in a dextrin roaster for 3 to 6 hours at a temperature of 130° C. to 160° C. with 10 to 20 ml. of 0.7 N HCl/lb. of starch derivative in presence of 5 to 12% moisture. This results in a hydroxyethyl dextrin or hydroxypropyl dextrin of 25 to 95 degrees fluidity and 5 to 11 hydroxyethyl or hydroxypropyl groups/100 anhydroglucose units.

The process comprises heating a hydroxyethyl or hydroxypropyl dextrin or hydroxyethyl or hydroxypropyl starch containing about 11 hydroxyethyl or hydroxypropyl groups/100 anhydroglucose units and about 3% moisture in the presence of about 3%, by weight based on the weight of starch derivative, organic anhydride, preferably succinic or maleic, at a temperature of about 130° C. for approximately one hour, and recovering the resulting esterified dextrin ether derivative. It is desirable to have the starting materials (dextrin and anhydride) in as finely divided state as possible and this may be accomplished by known methods such as grinding and blending prior to the heating process.

Subsequently, when thick layers of the mixture are heated, the reaction cannot be controlled properly, resulting in products of a widely varying degree of substitution, which also may be intensely colored near the reactor wall. We found that these drawbacks in the process can be avoided and that lightly colored, uniform reaction products can be obtained by carrying out the reaction under agitation. The agitation is accomplished by the type of agitation used in a conventional dextrin roaster which is a blade type agitator, changing the position of the starch granules with respect to each other and the heat exchange surface of the reactor, thereby eliminating localized hot spots and facilitating heat transfer, or by other known means.

The dextrin or starch is 40 to 80 mesh in size, preferably 60 mesh. The acid anhydride has a size of about 3½ to about 200 mesh, preferably about 60 mesh. This invention provides a simple and economical method for the preparation of low D.S. dextrin and starch ether-esters by eliminating the use of water and therefore the final steps of filtration, drying, etc in the process. The dextrin or starch ether-esters are used in the preparation of adhesives.

The moisture content of the reaction mixture composed of the dextrin or starch and, for example, succinic anhydride, at the time the reaction starts should be within the range of 0.5 to about 10 percent, and preferably is about 3% (based on the total weight of reactants).

The reactants are treated in a conventional dextrin roaster for about ¾ to about 2 hours and generally from about 1 to about 1¾ hours, preferably about 1½ hours.

The reaction temperature generally should be about 100° C. to about 160° C., preferably about 130° C. When a higher reaction temperature is used, it is necessary to shorten the reaction time in order to avoid decomposition of the product.

Means should be provided to constantly remove the water, which is a by-product of the reaction, during the heating process. This can be done by any conventional means, such as ambient air flow.

The organic acid anhydride may vary in amount depending on the degree of substitution desired in the final product. The organic acid anhydrides include succinic, maleic, phthalic, acetic, propionic, adipic, and anhydrides of mixtures of monobasic acids. Succinic and maleic acid anhydrides are preferred. The amount of the organic acid anhydride should be within the range of about 0.1 to about 10 percent (by weight based on the weight starch derivative). When higher reaction temperature is used, it is necessary to shorten the reaction time in order to avoid decomposition of the product. The esterification reaction between the dextrin derivative and the organic acid anhydride is preferably carried out at a temperature between 120° and 140° C.

About 9.5% to about 0.5% water is removed from the reaction mix during the reaction.

The final water content of the product is 0.5% to about 9.5% by weight of final product.

The starting starch or dextrin has a degree of fluidity of 40 to 60. The starch or dextrin preferably is mixed with anhydride and ground in a mill to a 40 to 60 mesh size. The reactants may be ground together for preparation or may be ground separately and then mixed.

Suitable dextrins include white and yellow dextrins made by roasting of starch derivatives in the presence of an acid catalyst.

British gums prepared by roasting starch in the absence of an acid catalyst are also suitable starting materials for this invention.

The amount of the organic acid anhydride may vary widely depending upon the degree of substitution desired. The amount of the anhydride should be within the range of about 0.1 to about 10 percent, preferably about 3%. This percent is percent by weight based on the weight of the starch or dextrin. The amount of starch or dextrin is about 99.4 to about 80 percent.

The final product has a degree of substitution of about 0.0016 to about 0.16, preferably about 0.046.

Sodium hydroxide is the preferred reagent for adjusting the pH of the composition since caustic also acts as an aid for borax in giving increased tack to the final adhesive. In order to avoid colorization of the adhesive it is necessary to allow the material to cool to a temperature of 130° F. or lower before addition of the sodium hydroxide solution. The pH of the adhesive composition should be adjusted to approximately 8 or 9.

Although they are not essential in the preparation of the adhesives, additives such as preservatives, defoamers and bleachers may be incorporated into the adhesive compositions.

The hydroxyethyl dextrin used in the following examples was prepared by roasting hydroxyethyl starch in the presence of hydrochloric acid (10 ml. of 0.7 N HCl per pound of hydroxyethyl starch) at a temperature of 130° C. for two hours. The product contained approximately 9 hydroxyethyl groups per 100 anhydroglucose units. The dextrin ether-esters are used for the preparation of paper laminating adhesives as shown in the following examples. The dextrin ether-ester based adhesive compositions of the present invention can be further modified to advantage by the addition of various other ingredients and by changing the quantities of the components in the formulation. The adhesives made from the dextrin ether-ester derivatives are superior to adhesives made from regular dextrins.

The following examples are illustrative of the products and processes of the present invention, but are not to be construed as limiting.

Preparation of organic dibasic acid esters of hydroxyethyl dextrin and hydroxyethyl starch

EXAMPLE I (A) Preparation of hydroxyethyl dextrin succinate 10 lbs. of white hydroxyethyl dextrin (2.9% moisture and 60 mesh size) was blended with 145 g. of pulverized succinic anhydride of 60 mesh size and heated in the dextrin roaster for 1½ hours at 135° C. The resulting product was recovered. The hydroxyethyl dextrin succinate contained 6 succinyl and 9 hydroxyethyl groups per 100 anhydroglucose units. The adhesives made from the product have shown excellent adhesion to various paper substrates. A paper laminating adhesive was made from hydroxyethyl dextrin succinate, borax and water.

Formula:
  267 g. hydroxyethyl dextrin succinate
  245 g. water
  2.2 g. borax (10 $H_2O$)
  1.5 g. sodium hydroxide (35% aq.)
  0.3 g. Dowicide G

EXAMPLE II (B) Preparation of paper coating adhesive 12.8 lbs. of white hydroxyethyl dextrin (2.6% moisture) was blended with 0.55 lb. of succinic anhydride flakes and heated in the roaster for 1¼ hours at 137° C. The product was recovered. The adhesives prepared from this hydroxyethyl dextrin succinates were good in Kraft paper laminations. The adhesive was made from hydroxyethyl dextrin succinate, EMA #11 (ethylene maleic anhydride copolymer resin), sodium hydroxide and water.

Formula:
  270 g. hydroxyethyl dextrin succinate
  237 g. water
  1.2 g. EMA #11 (Monsanto)
  2.1 g. sodium hydroxide (50% aq.)
  0.3 g. Dowicide G

EXAMPLE III (C) Preparation of hydroxyethyl dextrin maleate 10 lbs. of white hydroxyethyl dextrin (2.5% moisture) was blended with 0.5 lb. of maleic anhydride and reacted in the dextrin roaster for 55 minutes at 144° C. The product was recovered. The adhesives made from this hydroxyethyl dextrin maleate also were suitable for Kraft paper laminations.

Formula:
  270 g. hydroxyethyl dextrin maleate
  235 g. water
  2 g. borax (10 water)
  1.5 g. sodium hydroxide (50% aq.)
  0.3 g. Dowicide G

EXAMPLE IV (D) Preparation of hydroxyethyl starch succinate 10 lbs. of hydroxyethyl starch (8.5% moisture) was blended with 0.6 lb. of succinic anhydride and heated in the dextrin roaster for 1 hour at 133° C. The product was recovered. The hydroxyethyl starch succinate contained about 4 succinyl and 9 hydroxyethyl groups/per 100 anhydroglucose units. The product may be used for adhesive and thickening purposes. 1 part of this product boiled with 3 parts of water produces a transparent cohesive paste.

EXAMPLE V (E) Preparation of hydroxypropyl dextrin succinate 10 lbs. of hydroxypropyl dextrin (3% moisture and 60 mesh size) was blended with 136 g. of succinic anhydride of 80 mesh size and heated in the dextrin roaster for 1¾ hours at 135° C. The resulting product was recovered. The hydroxypropyl dextrin succinate contained 5 succinyl and 9 hydroxypropyl groups per 100 anhydroglucose units.

A kraft paper laminating adhesive was made from hydroxypropyl dextrin succinate, borax and water which had the following formula:

270 g. hydroxypropyl dextrin succinate
380 g. water
1 g. borax (10 $H_2O$)
1.6 g. sodium hydroxide (35% aq.)
0.2 g. Dowicide G

What is claimed is:

1. A method of making ether-ester derivatives of starch based products which consists essentially of providing a mixture of about 99.4 to about 80 parts starch ether based reactant and from about 0.1 to about 10 parts dibasic acid anhydride having a moisture content of about 0.5 to about 10%, said starch ether based reactant and said dibasic acid anhydride each being in pulverized form and intimately blended in said mixture, heating said mixture within the temperature range of about 100 to about 160° C. while constantly removing the water formed as a by-product, continuing such heating until the degree of substitution is about 0.0016 to about 0.16 and then recovering the product.

2. The method of claim 1 wherein the starch ether based reactant is a hydroxyethyl dextrin of about 25 to about 95 degree fluidity.

3. The method of claim 1 wherein the starch ether based reactant is a hydroxypropyl dextrin of about 25 to about 85 degree fluidity and about 5 to about 11 hydroxypropyl groups per 100 anhydroglucose units.

4. The method of claim 1 wherein the dibasic acid anhydride is selected from the group consisting of maleic, succinic and mixtures thereof.

5. The method of claim 1 wherein the time of reaction is about ¾ to about 2 hours.

6. The reaction of claim 1 wherein the starch ether based reactant has a mesh size of 40 to 80 and the dibasic acid anhydride has a mesh size of 3½ to 200.

7. The method of claim 1 wherein the starch ether based reactant is a hydroxyethyl dextrin having about 5 to about 11 hydroxyethyl groups per 100 anhydroglucose units, and about 25 to about 95 degree fluidity, and the dibasic acid anhydride is selected from the group consisting of maleic, succinic and mixtures thereof, and wherein the reaction time is about ¾ hour to about 2 hours.

References Cited

UNITED STATES PATENTS

| | | | |
|---|---|---|---|
| 2,461,139 | 2/1949 | Caldwell | 260—233.5 |
| 2,914,526 | 11/1959 | Paschall | 260—233.5 |
| 3,580,906 | 5/1971 | Bernasek | 260—233.5 |
| 1,994,038 | 3/1935 | Hagedorn et al. | 260—226 |

OTHER REFERENCES

Kirk-Othmer, Encyclopedia of Chemical Technology, 2d edition, vol. 4 (1964), pp. 146 and 147.

DONALD E. CZAJA, Primary Examiner

M. I. MARQUIS, Assistant Examiner

U.S. Cl. X.R.

106—213; 117—127, 156; 161—268; 260—9 R, 233.3 R